(12) United States Patent
Finkelstein (10) Patent No.: US 6,418,101 B1
(45) Date of Patent: Jul. 9, 2002

(54) DIGITAL READ CHANNEL FOR OPTICAL DISK READER

(75) Inventor: Koby Finkelstein, Kfar Saba (IL)

(73) Assignee: Zen Research (Ireland), Ltd., Dublin (IE)

( * ) Notice: Subject to any disclaimer, the term of this patent is extended or adjusted under 35 U.S.C. 154(b) by 0 days.

(21) Appl. No.: 09/389,777

(22) Filed: Sep. 3, 1999

(51) Int. Cl.[7] ................................................. G11B 7/00
(52) U.S. Cl. ............................... 369/47.18; 369/59.12; 369/59.22
(58) Field of Search ........................... 369/47.15, 47.18, 369/47.19, 47.35, 59.11, 59.12, 59.21, 59.22

(56) References Cited

U.S. PATENT DOCUMENTS

| | | |
|---|---|---|
| 4,945,538 A | 7/1990 | Patel |
| 5,345,342 A | 9/1994 | Abbott et al. |
| 5,347,506 A | 9/1994 | Matsudo et al. |
| 5,363,352 A | 11/1994 | Tobita et al. |
| 5,426,623 A | 6/1995 | Amir Alon et al. |
| 5,469,415 A | 11/1995 | Fujita et al. |
| 5,600,626 A | 2/1997 | Yokogawa et al. |
| 5,619,539 A | 4/1997 | Coker et al. |
| 5,627,805 A | 5/1997 | Finkelstein et al. |
| 5,680,380 A | 10/1997 | Taguchi et al. |
| 5,696,639 A | 12/1997 | Spurbeck et al. |
| 5,745,464 A | 4/1998 | Taguchi et al. |
| 5,771,127 A | 6/1998 | Reed et al. |
| 5,802,118 A | 9/1998 | Bliss et al. |
| 5,835,295 A | 11/1998 | Behrens |
| 6,215,751 B1 * | 4/2001 | Tsuchinaga ................... 369/59 |

FOREIGN PATENT DOCUMENTS

| | | | |
|---|---|---|---|
| JP | 06338782 | 12/1994 | |
| JP | 08339545 | 12/1996 | |
| JP | 409161408 | * 6/1997 | ................ 369/59 |
| JP | 11126433 | 5/1999 | |

* cited by examiner

Primary Examiner—Nabil Hindi
(74) Attorney, Agent, or Firm—Fish & Neave; Nicola A. Pisano; Michael J. Dehaemer, Jr.

(57) ABSTRACT

The present invention provides digital read channel circuitry for an optical disk reader. An RF signal corresponding to a track on the optical disk is sampled to provide digital samples corresponding to the RF signal. The samples are taken at a rate that may differ from the channel bit rate of the RF signal. The digital samples are then processed to provide data at the channel bit rate.

Multiple digital read channels may be used to read multiple tracks of an optical disk simultaneously. The multiple RF signals may be sampled based on a sample clock common to the multiple digital read channels.

8 Claims, 5 Drawing Sheets

DIGITAL READ CHANNEL FOR OPTICAL DISK READER

FIELD OF THE INVENTION

The present invention relates to circuitry for simultaneously reading multiple tracks of an optical disk, and more specifically to digital read channel circuitry suitable for implementation as an integrated circuit.

BACKGROUND OF THE INVENTION

Due to their high storage density, long data retention life, and relatively low cost, optical disks have become the predominant media format for distributing information. Large format disks, and more recently, DVD disks, have been developed for storing full length motion pictures. The compact disk (CD) format was developed and marketed for the distribution of musical recordings and has replaced vinyl records. High-capacity, read-only data storage media, such as CD-ROM and DVD-ROM, have become prevalent in the personal computer field, and the DVD format may soon replace videotape as the distribution medium of choice for video information.

Physically, the information bearing portion of an optical disk is a series of pits, or bumps, arranged to form a spiral track. Data is encoded in the length of individual pits and of the space between pits. A laser beam reflected off of the optical disk is modulated by the pits and spaces, and received by a detector which produces a similarly modulated electrical signal, or track data signal.

The track data signal is demodulated to recover digital information stored on the disk by observing the amplitude of the track data signal responsive to a data clock. The characteristics of the track data signals enable the data clock to be derived from the track data signal using phase locked loop (PLL) circuitry. Data is encoded such that if the amplitude of the track data signal is approximately the same from one sample to the next, the corresponding bit has a value of '0'; and a value of '1', otherwise.

The linear density of the bits and the track pitch are fixed by the specification of the particular optical disk format. For example, CD disks employ a track pitch of 1.6 $\mu$m having approximately 80 thousand channel bits per linear inch, while DVD employs a track pitch only about one-half as wide and having approximately 200 thousand channel bits per linear inch. Because in most previously known systems the data are read from the disk serially, i.e. one bit at a time, the maximum data transfer rate for an optical disk reader is determined by the rate at which the pits pass by the pickup assembly.

Most prior efforts at increasing data transfer rates focused on rotating the optical disk at higher speeds, thereby increasing the rate at which the pits pass by the pickup assembly. However, cost, heat, vibration, and other practical considerations limit maximum spindle speed to about 6000–7000 rpm.

A cost effective alternative to increasing the disk rotational speed to provide faster optical disk readers is to read multiple data tracks simultaneously, as described in commonly assigned U.S. Pat. No. 5,426,623 to Alon et al. In accordance with the methods and apparatus provided therein, a multi-beam optical disk reader is capable of achieving very high speeds when reading an optical disk. A seven beam reader, for example, which rotates the disk at 8×standard speed, would provide a data rate equivalent to a 56×drive. Thus, simultaneously reading multiple tracks of an optical disk provides significant increases in data reading rates at relatively low spindle speeds, as compared to optical systems that read a single track.

It should be noted that as used herein, a data track is a portion of the spiral data track of a typical optical disk which follows the spiral for one rotation of the disk. Thus, a drive capable of reading multiple data tracks simultaneously reads multiple such portions of the spiral track at once. For optical disks having concentric circular tracks, a data track would refer to one such circular track. For disks having multiple concentric spiral tracks, a data track would refer to one revolution of one of the concentric spiral tracks.

One method of reading multiple data tracks is to replicate circuitry for reading single tracks. That is the circuitry represented by FIG. 1. would be repeated for each track. So an optical disk reader capable of simultaneously reading ten tracks would include ten sensors, equalizers, slicers, low pass filters (LPF), PLL's, samplers, and demodulators. This results in circuitry of increased size, complexity, and expense.

The presence of multiple PLLs may cause difficulties for the circuit designer. Combining such circuitry into a single integrated circuit (IC), may cause interference between the analog circuits, such as the voltage controlled oscillator (VCO) portion of the PLLs, which may adversely affect circuit operation. To minimize such interference, the VCOs need to be physically spaced apart from one another on the IC. This effectively limits the number of PLLs that may be located on a single IC, which has the practical effect of limiting the number of channels that may be processed by a single IC.

It would therefore be desirable to provide methods and apparatus for simultaneously reading multiple tracks of an optical disk.

It would also be desirable to provide methods and apparatus that minimize interference between circuits.

It also would be desirable to provide methods and apparatus for simultaneously reading multiple tracks of an optical disk that would be conducive to high levels of circuit integration without compromising circuit performance.

SUMMARY OF THE INVENTION

In view of the foregoing, it is an object of the present invention to provide methods and apparatus for simultaneously reading multiple tracks of an optical disk.

It is also an object of the invention to provide methods and apparatus for simultaneously reading multiple tracks of an optical disk that enable high levels of circuit integration, without compromising circuit performance.

These and other objects of the present invention are achieved by providing a digital read channel that eliminates the need for separate analog PLLs for each track. An optical disk reader constructed in accordance with the present invention includes analog to digital converters (ADCs) for sampling the analog track data signals and converting the samples to digital values. The digital values are then digitally processed to recover data that was stored on the optical disk.

A frequency detector analyzes the processed digital values to identify synchronization symbols and data frames therein. The length of the synchronization symbols and the interval between two successive synchronization symbols are used to establish a time base for processing the digital values. This enables the digital read channel circuitry to rapidly determine the frequency of a track data signal.

A digital PLL (DPLL) uses the frequency information to lock onto the frequency of the track data signal. The DPLL has wide band (WB) and narrow band (NB) modes. The WB mode is entered after frequency has been determined by the frequency detector. When the DPLL is locked onto the frequency of the track data signal it enters the NB mode. This mechanism enables the DPLL to lock onto a track data signal rapidly, yet retain a higher degree of noise immunity.

In an embodiment for reading multiple tracks simultaneously, the multiple tracks may be sampled at the same rate and preferably at the same time. Digital read channel circuitry may be provided for each track being read, or alternatively, the read channel circuitry may be time shared between two or more tracks.

BRIEF DESCRIPTION OF THE DRAWINGS

The above and other objects and advantages of the present invention will be apparent upon consideration of the following detailed description taken in conjunction with the accompanying drawings, in which like characters refer to like parts throughout, and in which.

DETAILED DESCRIPTION OF THE INVENTION

For ease of understanding, the description of the present invention is presented in a number of sections. First, the operation of a previously known optical disk reader is described, followed by a description of the present invention.

Typically, data is encoded on an optical disk as a series of pits of various lengths. Other methods of encoding include phase or color changing material. The disk is read by reflecting a beam from a laser diode off of a portion of the disk such that the intensity of the reflected beam is modulated by the encoded data. The reflected laser beam is then detected, demodulation, and decoded to extract the data that had been recorded on the optical disk.

Figure 1:
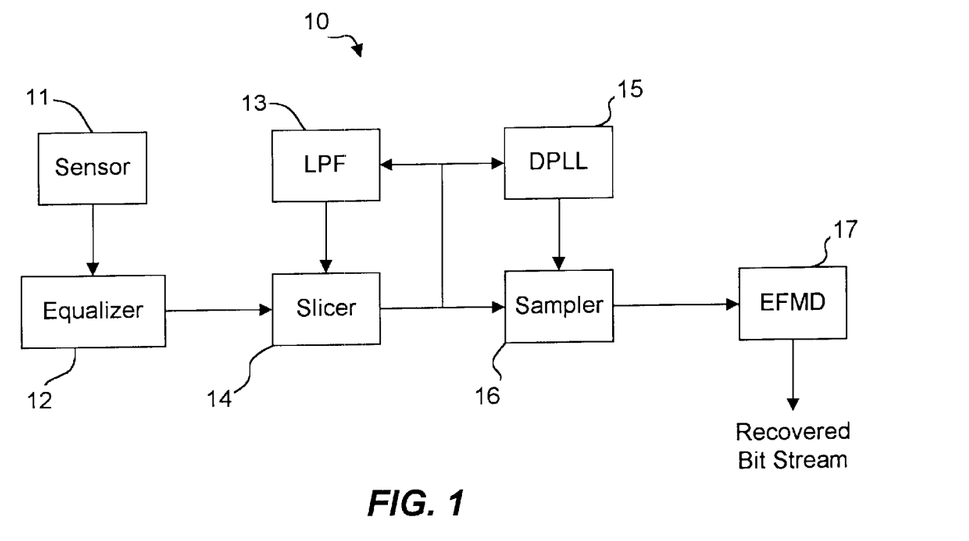
FIG. 1 is a simplified functional block diagram of a read channel for a typical previously known optical disk reader.

Circuitry for detecting and demodulating the reflected laser beam is represented by block diagram 10 of FIG. 1, including sensor 11, equalizer 12, low pass filter (LPF) 13, slicer 14, phase-locked loop 15, sampler 16, and eight-of-fourteen modulation demodulator 17. Collectively, the electronics represented by block diagram 10 are referred to as a read channel.

Figure 2:
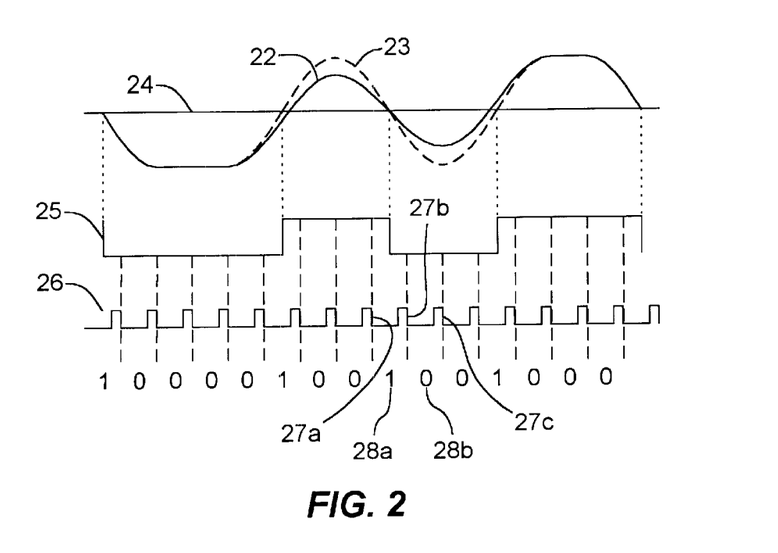
FIG. 2 shows how data is extract from an optical disc using previously known methods.

Sensor 11 detects the reflected laser beam, and generates an electrical signal, often called an "RF" signal, corresponding to the intensity of the reflected laser beam. Because the intensity of the reflected laser has been modulated by the data encoded on the optical disk, the amplitude of the RF signal also has a modulation corresponding to the encoded data. A short portion of exemplary RF signal 22 is shown in FIG. 2.

High frequency components of RF signal 22 are attenuated somewhat due to the frequency response of the optical and electronic components of the pickup assembly. This limits the slew rate of the RF signal and causes portions of RF signal 22 corresponding to short pits on the optical disk to have a lower amplitude than portions corresponding to long pits. To compensate for the high frequency attenuation equalizer 12 boosts high frequency signals in RF signal 22, resulting in equalized RF signal 23.

Square wave 25 is obtained from equalized RF signal 23 by comparing the amplitude of equalized RF signal 23 to threshold signal 24. When the amplitude of equalized RF signal 23 exceeds threshold signal 24, threshold circuit 14, also called a slicer, drives square wave 25 high. Conversely, when threshold circuit 14 determines that the amplitude of equalized RF signal 23 is below threshold signal 24, it drives square wave 25 low. Low pass filter (LPF) 13 averages square wave 25 to provide threshold signal 24.

On a typical optical disk, data is encoded using an non-return-to-zero-inverted (NRZI) format, wherein a '1' bit is indicated by a transition in square wave 25, i.e., a change from low to high or high to low. Conversely, a '0' bit is encoded by the lack of a transition in square wave 25. For example, between edge 27a and 27b of clock signal 26, square wave 25 goes from high to low. This is decoded as a '1' as indicated by reference character 28a in FIG. 2. However, between edge 27b and 27c, square wave 25 remains low, which is decoded as a '0' indicated by reference character 28b. Thus, the value of a channel bit is determined by the presence of an edge during the channel bit period.

Phased-locked loop (PLL) 15 generates data clock 26 from square wave 25 using conventional techniques. Data clock 26 is used as a timing reference for extracting bits from square wave 25, and may also be used as an input to a servo system for controlling the spindle speed of the optical disk player. The frequency of data clock 26 corresponds to the bit rate of square wave 25. Sampler 16 determines the value of square wave 25 by examining it near the center of each bit period. For example, sampler 16 may sample square wave 25 on falling edges 27a–27c of data clock 26.

If sampler 16 determines that there has been a transition between successive samples of square wave 25, then a binary '1' is output; otherwise a binary '0'. The bits output by sampler 16 are then grouped into words and demodulated by eight-of-fourteen demodulator (EFMD) 17 to provide a data stream corresponding to the data recorded on the optical disk.

To provide increased data rates, optical disk readers have been developed that read multiple tracks simultaneously. In such a multi-track optical disk reader, a read channel, such as read channel 10, is provided for each track being read. Thus, for example, a seven track optical disk reader may include 7 copies of the circuitry of read channel 10.

Because optical disks are recorded using a constant linear velocity (CLV) the frequency of RF signal 22 will differ for each track being read. Even adjacent tracks differ enough in frequency and phase that a separate PLL and data clock must be provided for each track being read. This is also true of disks, such as some recordable optical disks, recorded using zoned CLV, because adjacent tracks may be in different CLV zones.

It is difficult to design an integrated circuit which includes multiple high frequency data clocks that differ slightly in frequency. Indeed, practical considerations may limit such an integrated circuit to circuitry for decoding no more than about four tracks. Thus, several such integrated circuits would be required to read more than four tracks simultaneously, leading to increase costs.

Advantageously, the method and apparatus of the present invention eliminates the need to provide each read channel with an analog PLL, enabling more than four read channels to be incorporated into a single IC.

Figure 3:
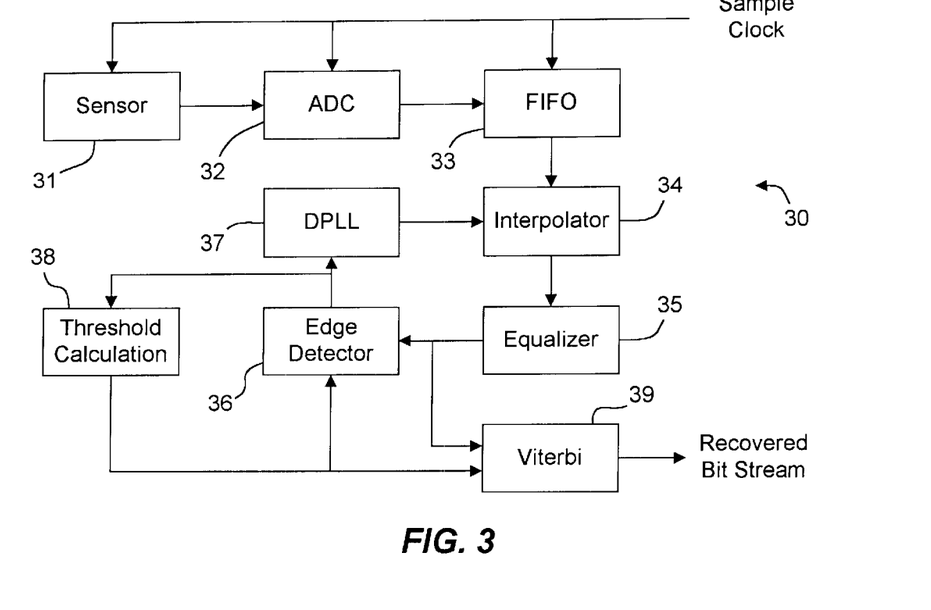
FIG. 3 is a simplified, functional block diagram of a read channel constructed in accordance with the principles of the present invention.
Figure 4:
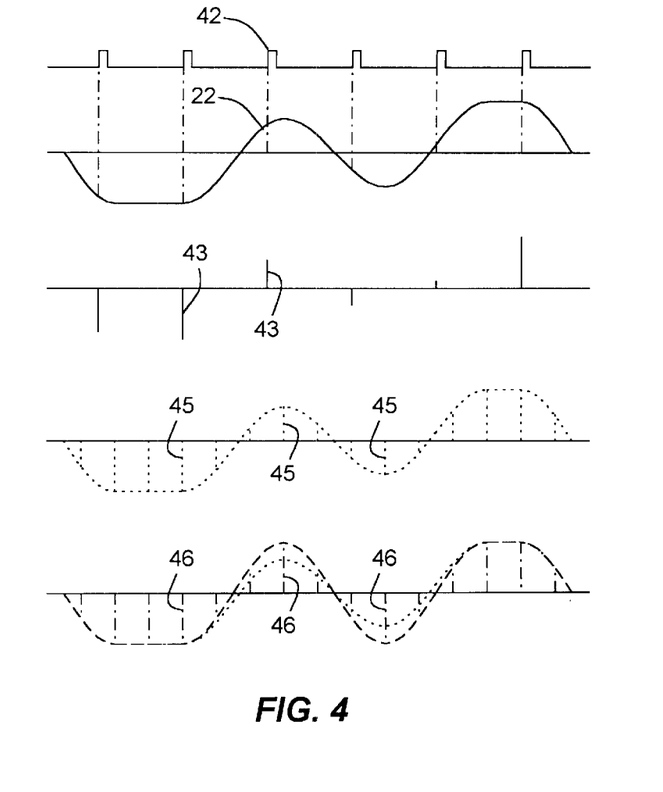
FIG. 4 shows how data is extracted from an optical disc in accordance with principles of the present invention.

Referring now to FIGS. 3 and 4, digital read channel 30, constructed in accordance with the principles of the present invention, is described. As in the optical disk reader of FIG. 1, sensor 11 outputs RF signal 22 corresponding to the modulation present in the intensity of the laser beam reflected from an optical disk track. However, RF signal 22 is not sliced, equalized, and sampled as in the conventional optical disk reader. Rather, RF signal 22 is sampled by analog-to-digital converter (ADC) 32 at regular intervals, as determined by sample clock 42. Digital samples 43 are numerical values representative of the amplitude of RF signal 22 at the sample time. Because sample clock 42 may not be synchronized to other digital read channel circuitry, digital samples 43 may be stored in optional first-in first-out buffer (FIFO) 33 to await further processing.

It is unnecessary that sample clock 42 have the same frequency as the channel bit frequency of the track being read. To accurately recover RF signal 22, it must be sampled at a frequency greater than its Nyquist frequency, i.e., slightly more than twice the maximum frequency of the signal. Specific values of sample frequency depend on the type of optical disk and the spindle speed of the optical disk reader. For example, a CD-ROM played in a 1×drive has a channel bit rate of approximately 4.3 MHZ, yielding an RF signal having a maximum frequency component of about 0.68 MHZ which corresponds to a Nyquist frequency of approximately 1.4 MHZ. Therefore, the RF signal should be sampled at a rate of greater than about 1.4 MHZ.

Figure 5:
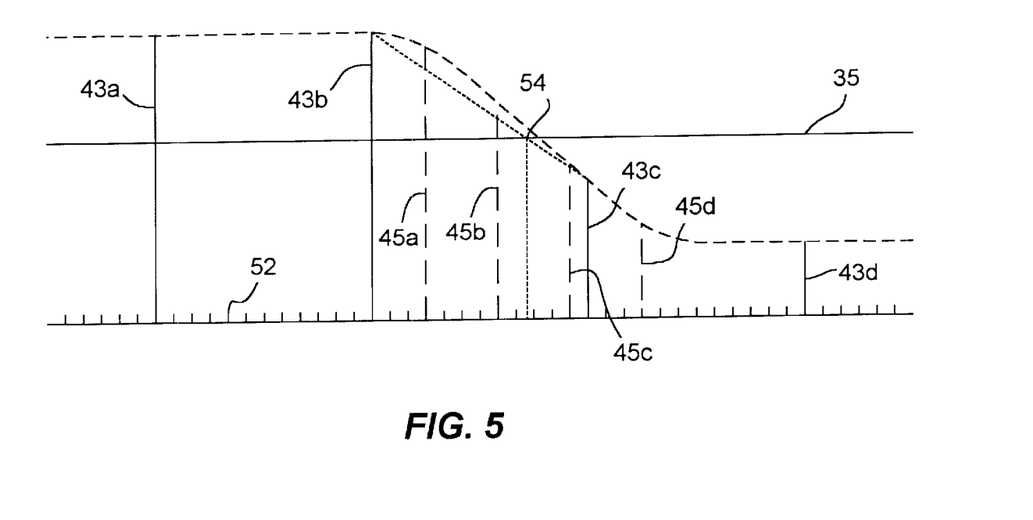
FIG. 5 shows the operation of the interpolator and edge detector of FIG. 3.

To demodulate the RF signal, it is necessary to determine the amplitude of the RF signal at each channel bit position. Digital samples 43 were obtained from ADC 32. The interval between successive digital samples is divided into a number of smaller subintervals, each corresponding to one of potential interpolation points 52. Although only a few interpolation points are shown in FIG. 5 to improve clarity of the drawings, the number of interpolation points may be much higher.

Digital PLL (DPLL) 37 determines the interval between successive channel bits and keeps track of the position of the next channel bit to be interpolated relative to the previous digital sample. To interpolate the next raw channel bit sample, the width of one channel bit is added to the offset value of the prior raw channel bit. The new offset value is then rounded to the nearest interpolation point and used to calculate a raw channel bit sample using an interpolation formula. For example, channel bit 45a is three interpolation points after digital sample 43b, and the channel bits are four interpolation points wide, so channel bit 45b should be sampled seven interpolation points after digital sample 43b.

In a preferred embodiment of the present invention, a high order interpolator is used to calculate the raw channel bits.

For example, it has been determined that a 4th order LaGrange interpolator is suitable for use in the present invention. The formulae for a LaGrange interpolator may be found in the *Handbook of Mathematical Functions,* M. Abramowitz and I. A. Stegun, Eds. Washington D.C., U.S. Government Printing Office 1964.

Because digital samples 43a and 43b are obtained asynchronously with respect to the operation of interpolator 34, care must be taken to ensure that interpolator 34 does not calculate a raw channel bit sample using old digital samples. For example, in FIG. 5, after calculating raw channel bit sample 45b, the DPLL offset is advanced to a position corresponding to raw channel bit sample 45c and then 45d. However, it is possible that the digital sample following digital sample 43d is not yet available, and interpolator 34 must wait before calculating raw channel bit sample 45d. In a system for reading multiple tracks simultaneously, digital read channel circuitry may use such waiting periods to process digital samples from other tracks being read. Circuitry for such a system is shown in the block diagram of FIG. 9.

Referring again to FIGS. 3 and 4, raw channel bit samples 45 are then filtered by equalizer 35 which boosts high frequency components to compensate for the optical frequency response of the optical disk reader. Many methods of digital filtering are known, which may be suitable for this purpose. For example, a finite impulse response (FIR) filter has been used with satisfactory results.

Channel bit samples 46 are then demodulated to recover the data stored on the optical disk. The optical response of an optical disk pickup assembly may affect RF signal 22 such that the digital samples 43 differ from the ideal. This may result in errors in calculating channel bit samples 46. It is therefore desirable to demodulate and decode the channel bit samples using a statistical algorithm. For example, in a preferred embodiment of the present invention, a Viterbi-type algorithm is used to extract the most likely channel bit based on channel bit samples 46.

Figure 6:
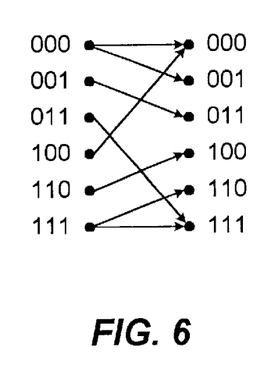
FIG. 6 is a trellis diagram showing the valid states and transitions for a three bit sequence.

A possible trellis diagram for implementing a Viterbi algorithm to decode bits from a CD-type optical disk is shown in FIG. 6, wherein 3-bit sequences are examined. The patterns along the left of the diagram represent the current state, and the arrows indicate possible transitions to the new states on the right. For example, '000' on the left indicates that the last three bits examined were all zeros, and it is possible to transition to states '000' or '001'.

Some states are not included in the diagram of FIG. 6, because they are not valid bit sequences for a CD-type optical disk. For example, the specification requires that there at least three and no more than 11 consecutive bits of the same value. Therefore, bit sequences such as '010', and '101' are not valid.

Figure 7:
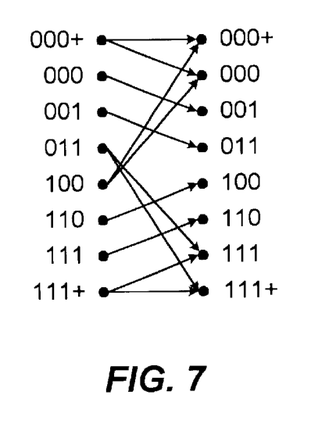
FIG. 7 is the trellis diagram of FIG. 6 expanded to provide eight states.

The trellis diagram of FIG. 7 is modified from the diagram of FIG. 6 by including two addition states—'000+' and '111+'. These states represent the situation wherein there has been more than three consecutive bits of the same value. It has been determined that basing the Viterbi algorithm on the modified trellis diagram of FIG. 8, improves system performance by lowering the bit error rate.

Referring back to FIG.. 3, edge detector 36, DPLL 37, and threshold calculation circuitry 38 work together to provide a time base for calculating raw channel bits 45 by exploiting characteristics of the format of the data recorded on the optical disk. Data on an optical disk is typically organized into units called frames or blocks. Each frame begins with a special synchronization pattern and contains a fixed number of channel bits. For example, on a CD-type disk the synchronization symbol consists of two zero-crossings 11 channel bits apart followed by a third zero-crossing 11 channel bits after the second zero-crossing, and a data block contains 588 channel bits. On a DVD-type disk the synchronization signal consists of two zero-crossings 14 channel bits apart and a frame includes 1488 channel bits.

The synchronization pattern is unique on CD or DVD optical disk in that no other valid symbol is as long as the synchronization symbol. Thus, finding a synchronization symbol is a matter of finding the longest interval between successive zero-crossings in the RF signal.

Edge detector 36 detects when the RF signal has crossed a threshold level set by threshold calculation circuitry 38. Such an event is referred to as an edge or a zero-crossing. Zero-crossings are found by comparing successive digital samples (43). If the samples are on opposite sides of the threshold, then a zero-crossing has occurred. When a zero-crossing is detected, the edge position is calculated by interpolating between the digital samples, as shown in FIG. 5

First, digital samples 43a and 43b are compared. Since the samples are both above threshold 35, no zero crossing has occurred. However, digital samples 43b and 43c are on opposite sides of threshold 35, indicating a zero-crossing. The position, or time, of zero crossing 54 is determined by linearly interpolating between digital samples 43b and 43c. DPLL 37 uses the zero crossing information provided by edge detector 36 to establish a time base for measuring channel bit positions.

DPLL 37 operates in a number of different modes or states. In a startup mode, DPLL 37 has little or no information and is unable to provide accurate timing information. In this mode, DPLL 37 measures the length of synchronization symbols and data frames. The measured lengths are compared to the specified lengths, e.g., a CD synchronization symbol is 22 channel bits and a frame is 588 channel bits, and the channel bit size adjusted as necessary. When the measured lengths of the synchronization symbols and frames are sufficiently close to the desired lengths, and there is a good correlation between the length of the synchronization symbol and frame length, DPLL 37 shifts into a phase-locked loop mode.

It has been determined that there are typically fewer than about 400 zero-crossings between synchronization symbols. Therefore, the longest interval between successive edges measured in a window of 400 zero crossings is taken to be a first synchronization symbol. A second window, beginning after the first synchronization symbol is searched to find a second synchronization symbol. Because the number of channel bits in a synchronization symbol and in a frame are known quantities, the measured length of the synchronization symbols and the interval between the first and second synchronization symbols may be used to calculate an estimate of the width of a channel bit. For example, on a CD-type disk, there are 588 channel bits per frame. Similarly, on a CD a synchronization symbol is 22 channel bits long, so the length of a channel bit may be calculated by the dividing the length of a frame by 588, or the length of a synchronization symbol by 22.

The computed values are then scaled and compared to see if they correlate to one another. Performing both calculations and comparing the results serves as a cross check. If the calculated values differ by more than about 1%, it is likely an error has occurred. For example, a synchronization symbol may have been missed or another symbol may have been mistaken for a synchronization symbol. In either case, DPLL 37 is returned to startup mode and the above described process is repeated.

Otherwise, the channel bit width is adjusted based on the value of calculated channel bit width, so that a frame will have the correct number of channel bits. DPLL 37 then has a frequency near that of the channel bit rate of the RF signal. When the frequency is sufficiently close to the RF frequency, DPLL 37 is shifted to operate in a wide band phase locked loop (PLL) mode.

Ideally, an edge should occur half way between a successive channel bit samples. The difference between the ideal edge position and the actual edge position represents a phase error. A servo system is used to adjust the channel bit width to keep actual edge positions centered between two channel bit samples. In the wide band PLL mode, the servo system constant are optimized to provide a relatively broad frequency capture range.

When in the wide band PLL modes, a consistency check is made by looking at the length of a frame. Correspondence between the measured and theoretical frame lengths indicates that frequency lock has been obtained. When this occurs, DPLL 37 is switched to operate in a narrow band mode in which the servo system constants are optimized to provide frequency tracking. The combination of wide band and narrow band PLL modes reduces overall capture time of DPLL 37.

A difference between the measured and theoretical frame lengths indicates a possible error. These errors are accumulated as a running error value. If the running error value becomes sufficiently large, it indicates that the frequency of the RF signal 22 has drifted beyond the capture range of the narrow band PLL mode and DPLL 37 is returned to a wide band PLL mode. A very large running error is an indication that frequency lock has been lost and DPLL 37 is reset to a startup mode.

Figure 8:
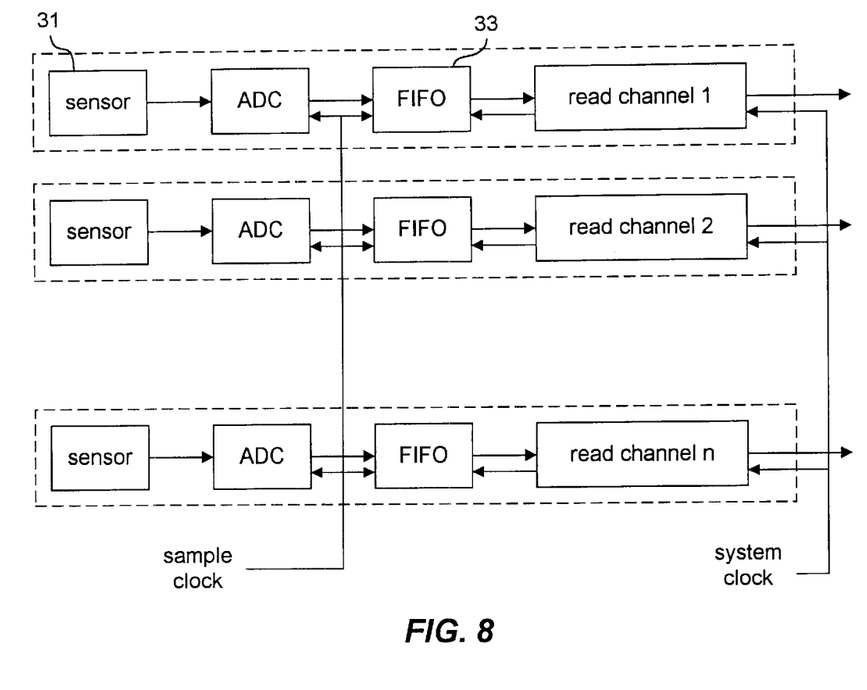
FIG. 8 is an illustrative block diagram showing multiple read channels in parallel.

A single digital read channel for optical disk readers has been described hereinabove. However, a principle advantage of the digital read channel is its application to simultaneously reading multiple tracks of an optical disk. As shown in FIG. 8, multiple digital read channels 60 may be configured in parallel. The sensors and analog-to-digital converters are clocked at a common sample clock frequency. This loads the digital samples into FIFOs. Read channels 60 are clocked by a common system clock. Thus, only two clocks are needed, which may have frequencies that are widely separated. For example, the sample clock need only have a frequency higher than the Nyquist frequencies of the RF signals being processed, whereas the system clock frequency is likely to be much higher.

A difference between the sampling rate and the rate at which the samples may be processed may be used advantageously by time sharing the processing circuitry between two or more tracks. For example, in FIG. 9, sensor 31a, ADC 32a, and FIFO 33a sense, sample, and store digital samples from a first optical disk track; whereas sensor 31b, ADC 32b, and FIFO 33b sense, sample, and store digital samples from a second optical disk track.

Figure 9:
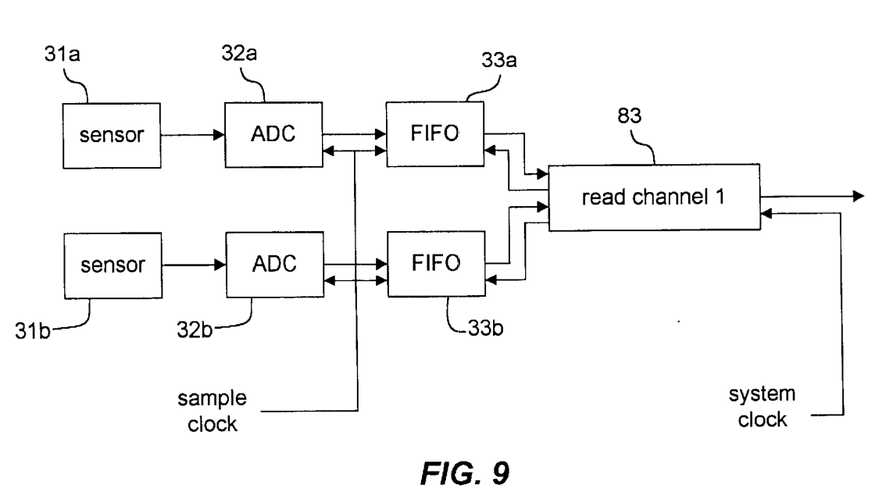
FIG. 9 is an illustrative block diagram showing digital read channel circuitry being time-shared for reading two tracks.

If read channel circuitry 83 is sufficiently fast, data may be recovered from the first track by retrieving and processing digital samples from FIFO 33a, while digital samples from the second track are accumulated in FIFO 33b. Then, read channel 83 may process the data samples from the second track by retrieving and processing digital samples from FIFO 33b, while digital samples from the first track are 20 accumulated in FIFO 33a. It is to be understood that in principle this may be extended to more than two tracks. Furthermore, multiplexing of multiple read channels may be done at other points in the signal processing. For example, the signals may be multiplexed at either the input or output of ADC's 32a and 32b.

Figure 10:
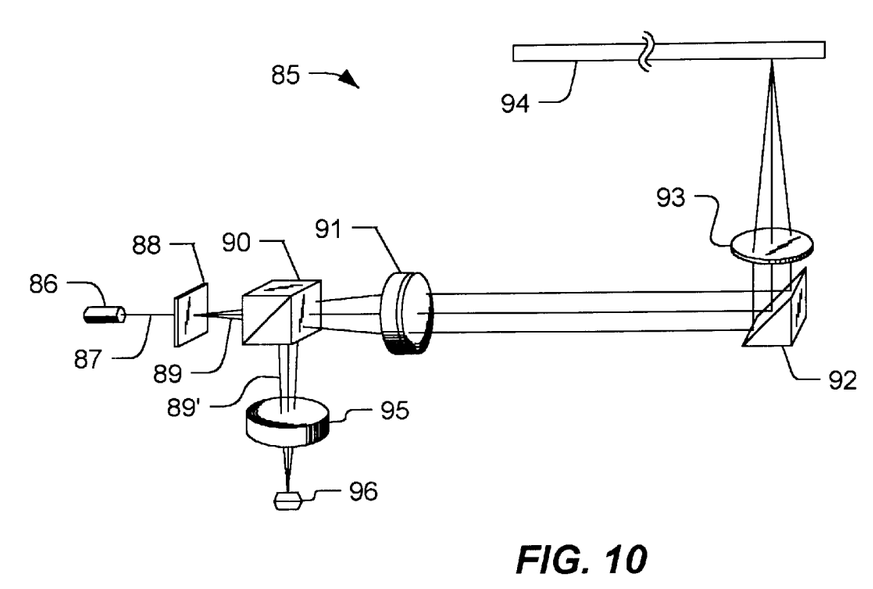

Referring to FIG. 10, previously known multi-beam optical pickup 85, suitable for use with the present invention, is described. Laser diode 86 generates illumination beam 87 that passes through diffractive element 88 and is split into a plurality of reading beams 89. Reading beams 89 pass through beamsplitter 90 and collimator 91, and are then reflected by mirror 92 to objective lens 93, which focuses the beams onto a surface of optical disk 94.

Reading beams 89 are reflected from a data-bearing surface of optical disk 94, modulated by the data recorded on a plurality of tracks of optical disk 94 to form light beams 89'. The reflected, modulated beams 89' again pass through objective lens 93 and collimator 91. Beamsplitter 90 directs beams 89' lens 95 onto detector array 96. Detector array 96 comprises a plurality of sensors which each provide a signal corresponding to the modulation of a corresponding one of light beams 89'. These signals are supplied as inputs to digital read channel circuitry as described herein above to read the data from the tracks of the optical disk. Signals output by detector array 95 also may be used to detect errors in the focus and tracking of the optical disk reader.

In accordance with the principles of the present invention the RF signal is converted to a sequence of digital samples which are then processed to recover the data stored on an optical disk. Preferably, the processing is performed by dedicated hardware; although, in some applications a digital signal processor may be used instead. In either case, the need for floating point processing may be largely eliminated, by careful selection of the various constants and coefficients used in performing the calculations.

While preferred illustrative embodiments of the present invention are described above, it will be evident to one skilled in the art that various changes and modifications may be made without departing from the invention. It is intended in the appended claims to cover all such changes and modifications which fall within the true spirit and scope of the invention.

What is claimed is:

1. A method of reading data on an optical disk comprising:

reflecting first and second laser beams off of the optical disk to obtain first and second reflected laser beams modulated by corresponding first and second data recorded on the disk;

sensing the first and second reflected laser beams and providing first and second signals responsive to the modulation thereof, the signals having a characteristic bit rate;

obtaining a plurality of digital samples of the first and second signals corresponding to amplitudes of the corresponding signal at a plurality of discrete sample times;

interpolating the plurality of digital samples to calculate a plurality of digital values corresponding to amplitudes of the respective signals at times other than the plurality of discrete sample times; and demodulating the plurality of digital values to recover the first and second data stored on the optical disk.

2. The method of claim 1 further comprising:

calculating a threshold value corresponding to an average of the digital values;

analyzing the plurality of digital values to determine when the signal has crossed the threshold value and calculating the time of any detected crossings.

3. The method of claim 2 further comprising establishing a time base for interpolating the plurality of digital samples responsive to the times of the detected crossings.

4. A method of reading data on an optical disk comprising:

reflecting first and second laser beams off of the optical disk to obtain first and second reflected laser beams modulated by corresponding first and second data recorded on the disk;

sensing the first and second reflected laser beams and providing first and second signals responsive to the modulation thereof, the signals having a characteristic bit rate;

obtaining a plurality of digital samples of the first and second signals corresponding to amplitudes of the corresponding signal at a plurality of discrete sample times;

interpolating the plurality of digital samples to calculate a plurality of digital values corresponding to amplitudes of the respective signals at times other than the plurality of discrete sample times; and demodulating the plurality of digital values to recover the first and second data stored on the optical disk analyzing the detected crossings to identify first and second start symbols in the signal;

measuring durations of the first and start symbols;

measuring an interval between the first and second start symbols; and adjusting the time base responsive to a comparison of the measured durations with the measured interval.

5. The method of claim 4 further comprising:

comparing the time of a detected crossing with an expected time of the crossing; and adjusting the time base responsive to the comparison.

6. The method of claim 1 further comprising:

storing the digital samples in a memory at the first rate; and retrieving the digital samples from the memory at a second rate.

7. A method of reading data on an optical disk comprising:

reflecting a first laser beam off of the optical disk to obtain a first reflected laser beam modulated by first data recorded on the disk;

sensing the first reflected laser beam and providing a first signal responsive to the modulation thereof;

reflecting a second laser beam off of the optical disk to obtain a second reflected laser beam having a modulation caused by second data recorded on the disk;

sensing the second reflected laser beam and providing a second signal responsive to the modulation thereof, the second signal having a characteristic bit rate;

selectively obtaining a plurality of digital samples of either the first or second signals corresponding to amplitudes of the selected signal at a plurality of discrete sample times;

interpolating the plurality of digital samples to calculate a plurality of digital values corresponding to amplitudes of the selected signal at times other than the plurality of discrete sample times; and demodulating the plurality of digital values to recover the data stored on the optical disk.

8. A method of reading data on an optical disk comprising:

reflecting a first laser beam off of the optical disk to obtain a first reflected laser beam modulated by first data recorded on the disk;

sensing the first reflected laser beam and providing a first signal responsive to the modulation thereof;

reflecting a second laser beam off of the optical disk to obtain a second reflected laser beam having a modulation caused by second data recorded on the disk;

sensing the second reflected laser beam and providing a second signal responsive to the modulation thereof;

obtaining a first plurality of digital samples of the first signal corresponding to amplitudes of the first signal at a first plurality of discrete sample times;

obtaining a second plurality of digital samples of the second signal corresponding to amplitudes of the second signal at a second plurality of discrete sample times;

selectively interpolating the first or second plurality of digital samples to calculate a plurality of digital values corresponding to amplitudes of the corresponding signal at times other than the discrete sample times; and demodulating the selected plurality of digital values to recover the data stored on the optical disk.

* * * * *